(12) United States Patent
Righini

(10) Patent No.: US 7,213,708 B2
(45) Date of Patent: May 8, 2007

(54) PACKAGING FOR METALLIC FINDINGS AND OTHERS, PARTICULARLY SMALL BLOCKS AND TWIST DRILLS

(76) Inventor: Giuseppe Righini, Via Morine 13/b, IT-40026 Imola, Bologna (IT), IT-40026

( * ) Notice: Subject to any disclaimer, the term of this patent is extended or adjusted under 35 U.S.C. 154(b) by 0 days.

(21) Appl. No.: 10/329,095

(22) Filed: Dec. 23, 2002

(65) Prior Publication Data

US 2004/0118734 A1 Jun. 24, 2004

(51) Int. Cl.
*B65D 73/00* (2006.01)

(52) U.S. Cl. .......................... 206/461; 206/467; 408/67
(58) Field of Classification Search .................. 206/338, 206/461, 462, 465, 468, 576; 408/67
See application file for complete search history.

(56) References Cited

U.S. PATENT DOCUMENTS

| | | | | |
|---|---|---|---|---|
| 3,756,398 A | * | 9/1973 | Green et al. ................ | 206/477 |
| 3,881,838 A | * | 5/1975 | Derbyshire ................... | 408/67 |
| 3,939,979 A | * | 2/1976 | Neumayer .................... | 206/461 |
| D273,565 S | * | 4/1984 | Driskell et al. .............. | D9/415 |
| 4,901,858 A | * | 2/1990 | Anderson .................... | 206/461 |
| 5,292,210 A | * | 3/1994 | Nowick ........................ | 408/67 |
| 5,603,408 A | * | 2/1997 | Protz, Jr. ..................... | 206/461 |

FOREIGN PATENT DOCUMENTS

| | | |
|---|---|---|
| EP | 401520 | 12/1990 |
| EP | 1270442 A2 | 1/2003 |
| IT | BO010056 | 12/2002 |

* cited by examiner

*Primary Examiner*—David T. Fidei

(57) ABSTRACT

A packaging for metallic findings and others, particularly small blocks and twist drills includes a plate element (2) and a hollow body (6) joined to the plate element (2) through joining members (3, 11); the joined hollow body (6) and plate element (2) form a space (7) for housing the findings; the packaging is characterised by the fact that an area (10) is provided in the hollow body (6), the area (10) allowing the access to the space (7); the area (10) is capable of being crossed by a twist drill (24) when the hollow body (6), disjoined from the plate element (2), rests on a wall, for allowing the access to the inner space (7) in order to hold the dust due to a drilling.

15 Claims, 6 Drawing Sheets

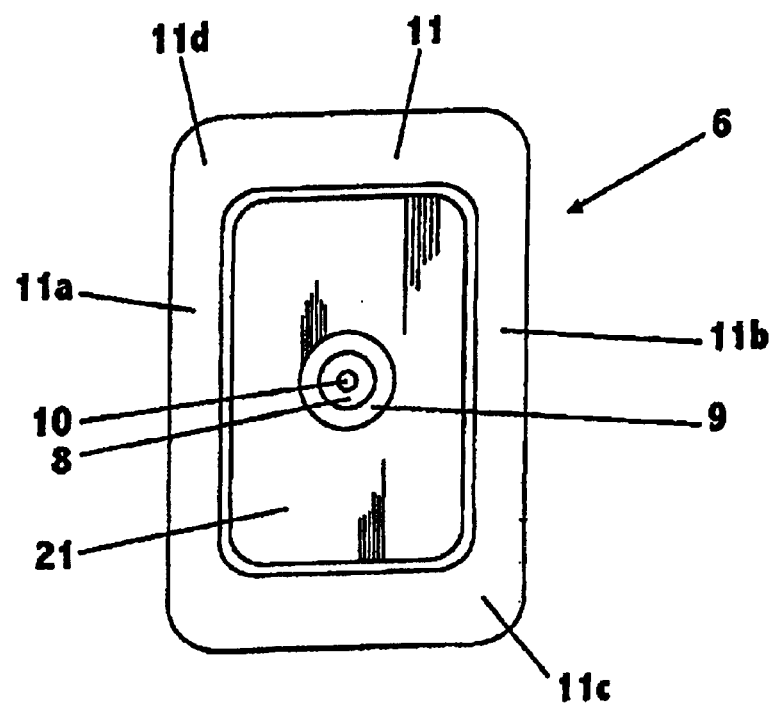
Fig. 2
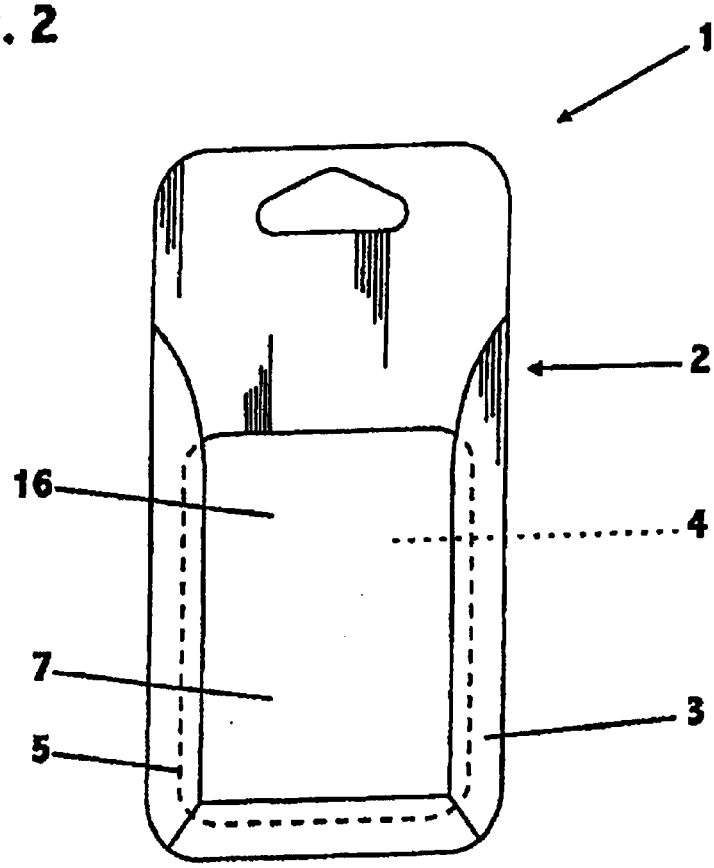

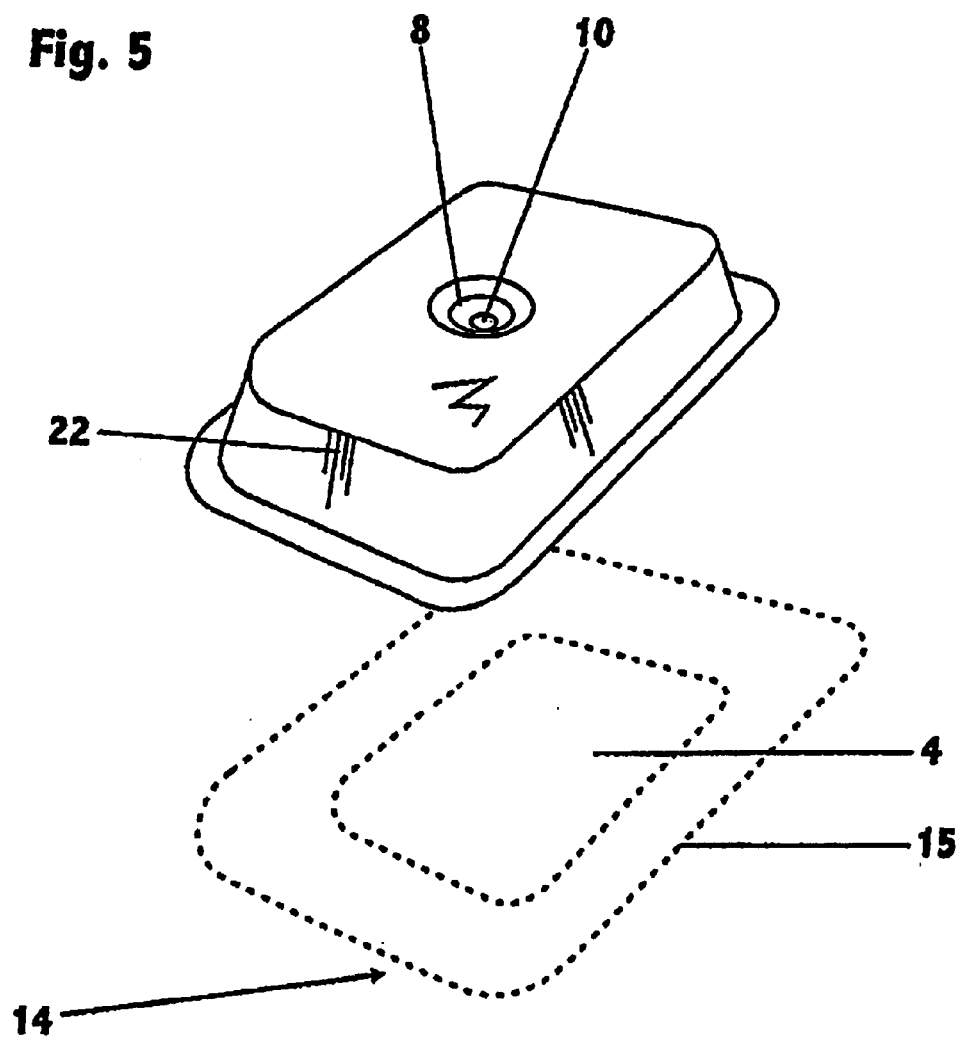

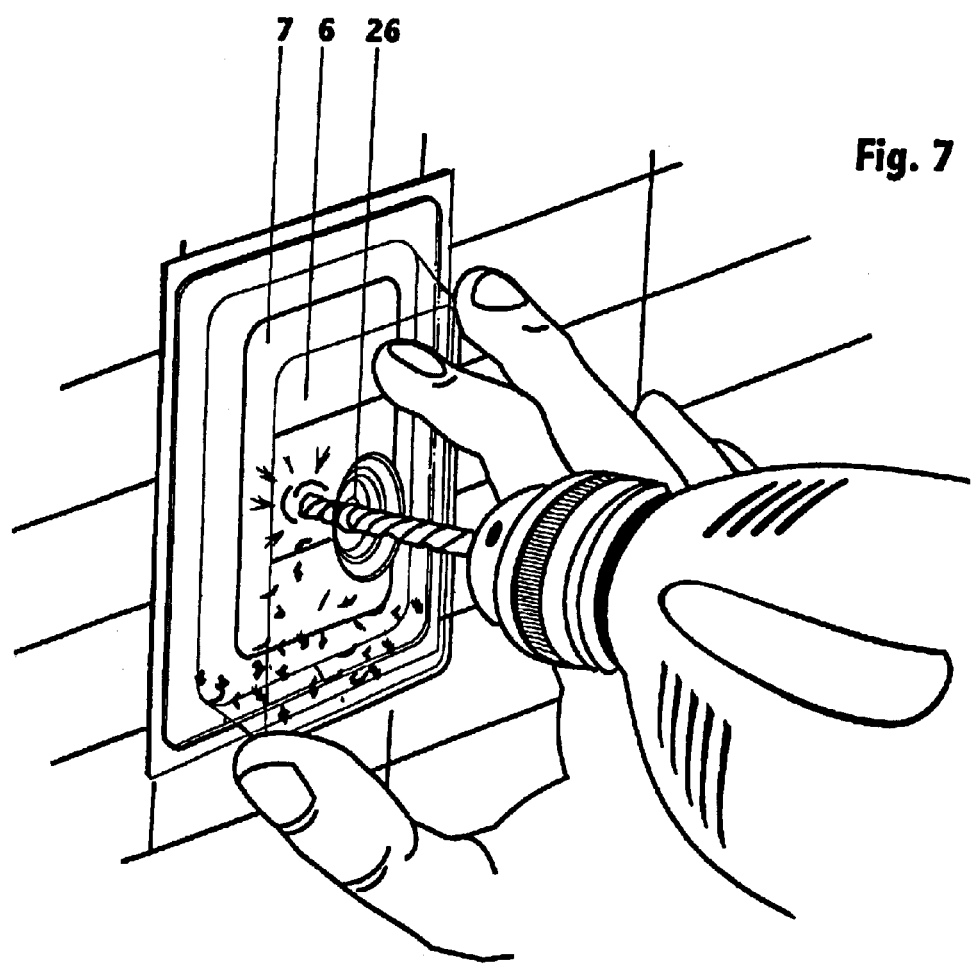

PACKAGING FOR METALLIC FINDINGS AND OTHERS, PARTICULARLY SMALL BLOCKS AND TWIST DRILLS

BACKGROUND OF THE INVENTION

The present invention concerns a packaging for metallic findings and others, particularly small blocks and twist drills.

It is known that during the use of the drill in a room a boring dust spreads and places on the floor, on the furniture and on the most hidden and inaccessible corners of the room.

The technical aim of the present invention is to remedy these defects.

A purpose of the present invention is to create a packaging capable of housing the findings and preventing the scattering of the dust in the environment.

A second purpose of the present invention is to reach the above aim by means of an easy structure, to be easily manufactured; in addition, the invention assures a safe use and an effective functioning.

A further purpose is the total recycling of the packaging which can be used again for more times to house the dust due to the drilling.

This aim and these purposes can be fully reached by the packaging according to the present invention, which is used for containing metallic findings, particularly small blocks and drills; the packaging includes a plate element and a hollow body fixed to the plate element by means of joining members.

The hollow body, shaped as a box, presents an opening, at least a lateral wall and at least a wall opposite to the opening; when the hollow body is a part of the packaging, that is when it is joined to the plate element, the opening is closed by a portion of said element; the opposite wall presents an area capable of being drilled by a twist drill, (i.e., a drill bit, hereinafter referred to as a "twist drill"), the drilling can occur when the hollow body is disjoined from the plate element; the disjoining allowing the use of the hollow body for housing the dust due to the drilling, which, otherwise, should be scattered in the environment; the drilled area can facilitate and guide the crossing of the twist drill every time the hollow body is used to hold the dust.

In a preferred embodiment the hollow body presents a recess located in the central portion of the opposite wall, the recess is capable of being drilled by the twist drill and of guiding said twist drill every time the hollow body is used to hold the dust.

Therefore, when the hollow body of the packaging is separated from the plate element, and it does not contain small blocks or findings, its opening can be supported by a wall to be drilled so that the hollow body can hold the dust due to the drilling.

BRIEF DESCRIPTION OF THE DRAWINGS

Other advantages, features and aims of the invention, may be more readily understood by referring to the accompanying drawings, which concern preferred embodiments, in which:

FIG. 2 illustrates a plan of the separated hollow body and plate element;

FIG. 5 is a perspective projection of the hollow body in a position where a gasket is detached from the hollow body;

FIG. 7 is a perspective projection of the hollow body which is used for holding the dust during the drilling.

DESCRIPTION OF PREFERRED EMBODIMENTS OF THE INVENTION

Referring to the above Figures, a packaging 1 includes a plate element 2 and a hollow body 6; the hollow body 6 is defined by the surface of a body; the perimeter of the basis of the body lies on a plane, said body presenting a central opening 16 which can directly or indirectly rest on the surface of the wall to be drilled; to form the packaging 1, the plate element 2 and the hollow body 6 are joined by known joining members.

Figure 1:
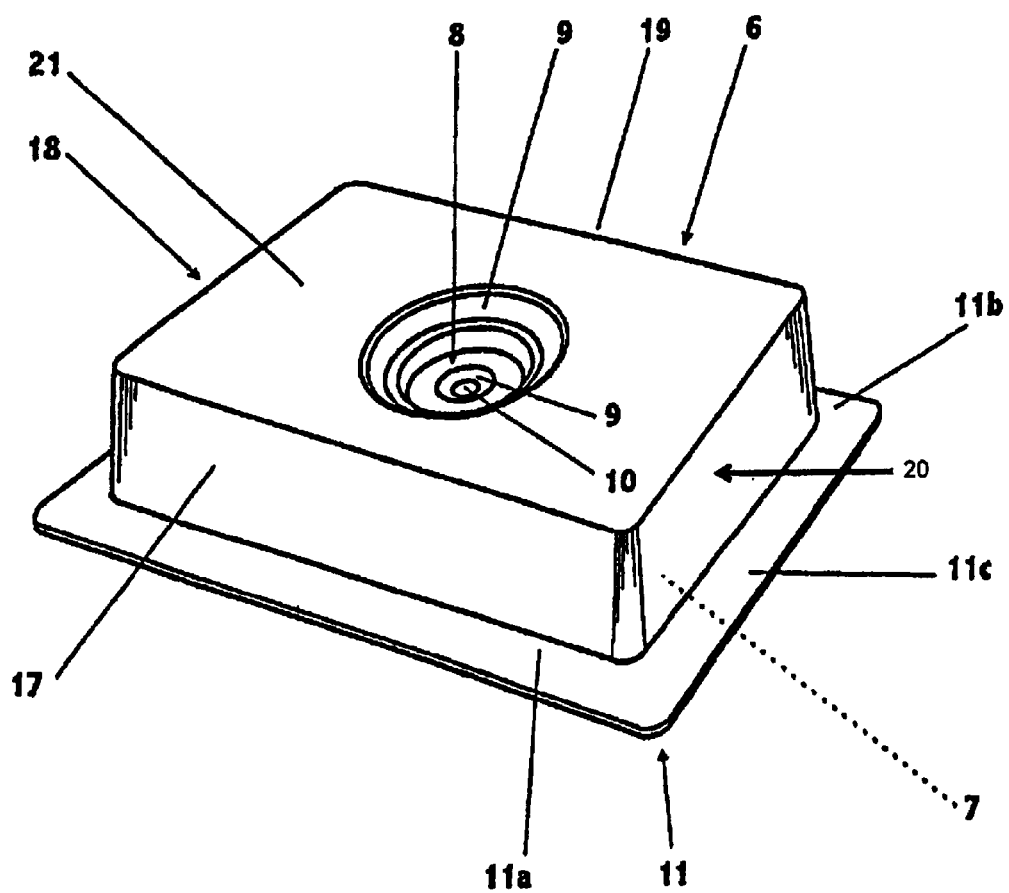
FIG. 1 shows a perspective projection of the hollow body according to the invention.

With reference to FIGS. 1, 2, the hollow body 6 is shaped like a box with a central opening 16, through that the packaging 1 is filled with said findings before to be closed by the joining members 3, 11; four lateral walls 17, 18, 19, 20 are provided, and one wall 21 is opposite to the central opening 16; the wall 21 closes, together with the lateral walls 17, 18, 19, 20 and a portion 4 of the plate element 2, a space 7. The side portion of the plate element 2 is fitted with a guide 3, consisting of the refolding of a rectangular area of the plate element 2, the guide 3 being delimited by preferential cutting lines 5.

The guide 3 joins the plate element 2 to the hollow body 6, while the preferential cutting lines 5 allow an easy removing of the portion 4 closing the central opening 16 when the hollow body 6 and the plate element 2 are joined; on the contrary, when the hollow body 6 and the plate element 2 have been disjoined by removing the material alongside the preferential cutting lines 5, the opening 16 is free and the hollow body 6 can be used to hold the dust.

The packaging 1, closed for housing small blocks or twist drills, consists of the plate element 2 and the hollow body 6 joined through joining members 3, 11 so that the portion 4 of the plate element 2 can close the central opening 16; in addition, an area 10 capable of being drilled by a twist drill is provided in a recess of the wall 21 of the hollow body 6; the area 10 is radiused to the wall 21 by concentric circular depressions 8, 9, the radius of which decreases up to reach the dimensions of the area 10; the area 10, when the plate element 2 is joined to the hollow body 6, is closed by the material of the hollow body 6 to maintain the original state of the box; therefore, the recess consists of the depressions 8, 9 and of the area 10.

On the contrary, when the plate element 2 is not joined to the hollow body 6, it is possible to drill the area 10 by means of a twist drill so that the twist drill enters into the space 7 contained by the hollow body 6 and, therefore, to the wall to be drilled on which the opening 16 rests. The recess is used as draft for the twist drill.

In the embodiment of FIG. 2, the joining members include the guide 3 and a side and plane flange 11 which engages the guide 3 with two long sides 11a, 11b and a short side 11c; the sides 11a, 11b, 11c, 11d, are found around the central opening 16.

To remove the findings from the packaging, the hollow body 6 is disjoined from the plate element 2. After disjoining, it is possible to use the hollow body 6 to hold the dust due to a drilling; for this purpose, the central opening 16 of the hollow body 6 rests on the wall to be drilled, the drill is inserted in the recess of the area 10 and the drilling can be started; the plane flange 11 of the hollow body 6 being used as sealing gasket. The material closing the area 10 is drilled and removed by the twist drill.

In this way, during the drilling, all the dust remains in the space 7, so that all the above mentioned problems and inconveniences can be avoided; in addition, during this operation, the recess 8, 9 and the area 10 guide the twist drill; the recess is used as a draft for the twist drill. This guiding function of the recess 8, 9 is carried out every time the hollow body 6 is used to prevent the dust from being spread in the room.

Figure 4:
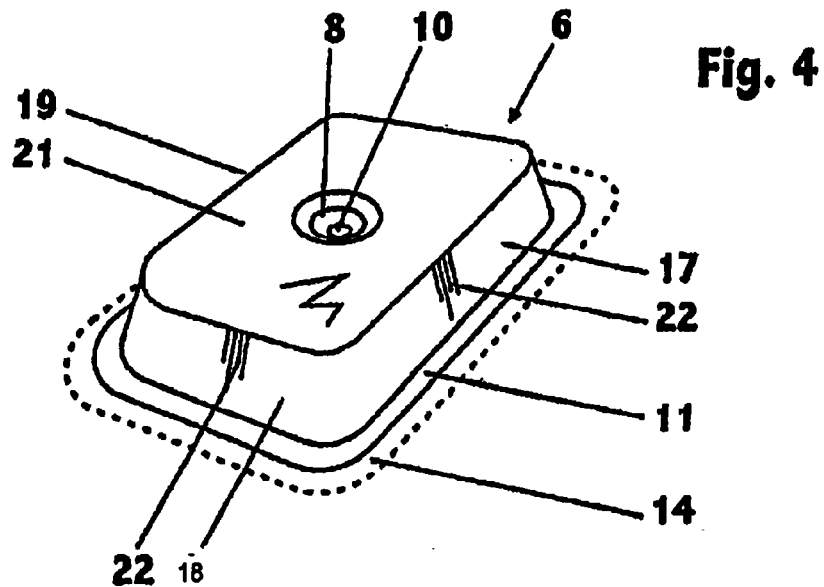
FIG. 4 is a perspective projection concerning the hollow body of FIG. 3 ready to be used.
Figure 3:
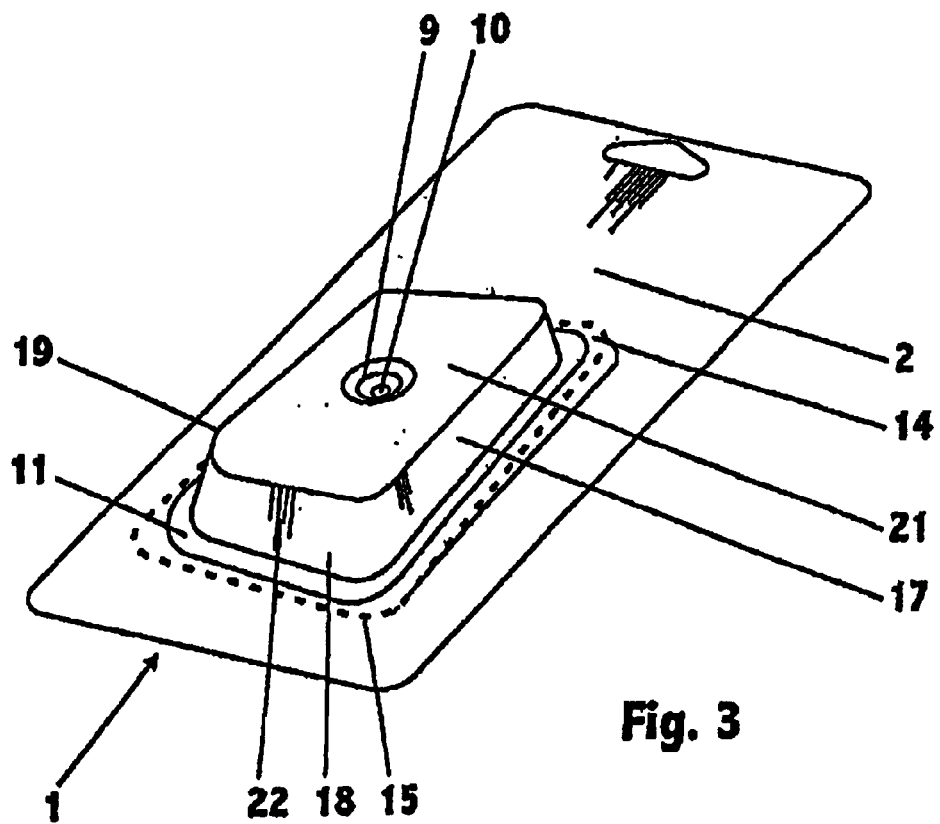
FIG. 3 is a perspective projection of a second embodiment of the packaging including the hollow body and plate element.

Advantageously, a second embodiment of the packaging is provided (FIGS. 3, 4, 5), in which the plane flange 11 cooperates with a gasket 14 to increase the sealing effect of the space 7; the gasket 14 is obtained from the material of the plate element 2 by removing a portion 4 of the plate element 2 by a cutting alongside the preferential cutting lines 15, 15'. The annular gasket 14 is found under the plane flange 11 and around the central opening 16, the central opening 16 allowing the access to the inner space 7; the gasket 14 adheres to the plane flange 11, since the body 6 is joined to the plane element 2 through the plane flange 11, when the packaging is brand-new.

Figure 6:
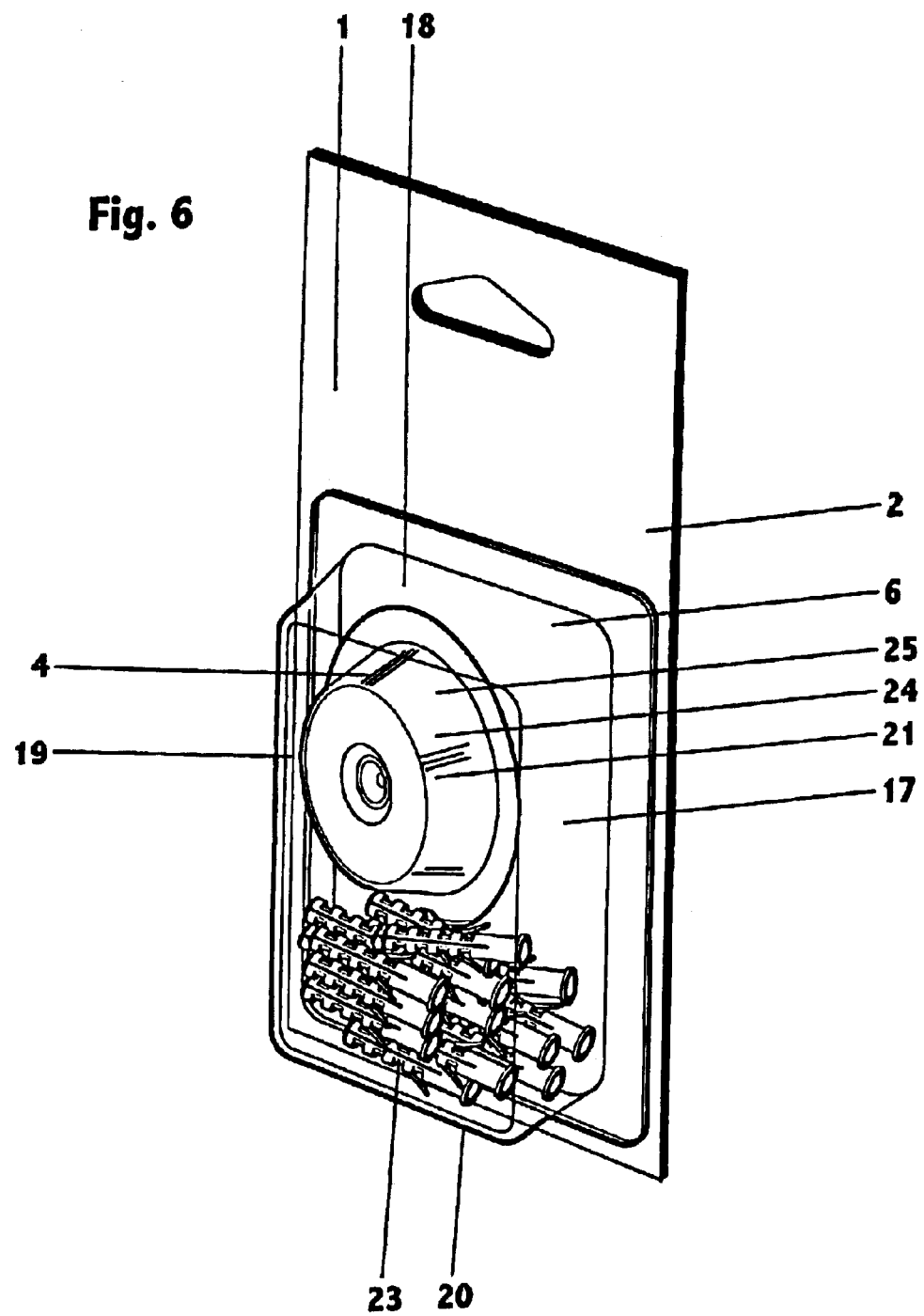
FIG. 6 is a perspective projection of the packaging closed by the plate element; said packaging housing findings (small blocks) and a tool for holding the dust.

The joining of the hollow body 6 to the plate element 2 can be obtained by sticking or heat sealing. In addition, the lateral walls 17, 18, 19, 20 are fitted with stiffening ribs 22 which stiffen the hollow body 6 supporting the pushing of the twist drill. The packaging 1 of FIG. 6 contains small blocks 23 and a second hollow body 24 capable of holding the dust due to the drilling; the shape of the hollow body 24 is identical, with respect to the concentric depressions (8,9) for guiding the drill, to that of the hollow body 6, but the second hollow body 24 is found inside the packaging 1, instead of being a part of hollow body 6 and fixed to the plate element 2. Of course the packaging 1 can contain a plurality of second hollow bodies 24 with or without small blocks 23. In addition, it is possible that only a single wall 25 laterally delimits the second hollow body 24.

FIG. 7 demonstrates the use of the hollow body 6 (24) to hold the dust due to the twist drill 26 in the space 7.

In an embodiment (not shown), the area to be drilled 10 is found in any point of the wall 21 opposite to the central opening 16.

What is claimed is:

1. A packaging for metallic findings and other items, comprising:
   a) a hollow body (6) delimiting a space (7) capable of being filled with findings, the hollow body (6) presenting a central opening (16), at least one lateral wall (17,18,19,20), and at least a wall (21) opposite to the opening (16);
   b) a plate element (2) capable of closing the opening (16) to form a packaging (1) for metallic findings and other items (26);
   c) a joining members capable of connecting at least one lateral wall (17, 18, 19, 20) to the plate element (2), whereby the plate element (2) may be applied across opening (16);
   d) an area (10) of wall (21) that is capable of being drilled and/or crossed by a twist drill (26), and that prior to such drilling is closed by material of the body hollow (6), whereby when plate element (2) or a portion thereof is disjoined from the opening (16) a twist drill (26) may drill through the area (10) and pass though wall (21) and the hollow body (6) to reach and drill into a surface on which opening (16) rests, whereby further the hollow body (6) may be used for preventing scattering of dust;
   e) wherein the area (10) is a part of a recess in wall (21) comprising concentric circular depressions (8,9) of different depths provided in the wall (21), the radiuses of the depressions (8,9) respectively decreasing toward the dimensions of the area (10).

2. A packaging as in claim 1, wherein the hollow body (6) comprises the central opening (16), four lateral walls (17, 18,19,20) and the wall (21) opposite to the central opening (16); said opening (16) delimiting, together with the lateral walls (17,18,19,20) and a portion (4) of the plate element (2), the space (7).

3. Packaging as in claim 2, wherein the opening (16) is adapted to be closed by (4) of the plate element (2) to maintain the original state of the packaging; and when the plate element (2) is disjoined from the hollow body (6), the area (10) is adapted to be drilled by a twist drill (26) in order to pass through the space (7) delimited by the hollow body (6) and reach the wall to be drilled.

4. Packaging as in claim 1, wherein the joining members (3,11) comprise a plane flange (11) placed around the central opening (16); and a guide (3) provided in the side portion of the plate element (2) is used for joining the plane flange (11) to the plate element (2).

5. Packaging as in claim 4, wherein the guide (3) is formed by the refolding of a rectangular area of the plate element (2) delimited by preferential cutting lines (15).

6. Packaging as in claim 5, wherein the plane flange (11) co-operates with a gasket (14) for increasing the sealing of the space (7) when the opening (16) rests on the surface that is to be drilled.

7. Packaging as in claim 1, wherein the at least one lateral wall (17, 18,19,20) is fitted with stiffening ribs (22) capable of stiffening the hollow body (6) to resist a tendency of the hollow body (6) to deform in response to a pushing of the twist drill (26).

8. Packaging as in claim 1, wherein the hollow body (6) is delimited by a lateral surface (25) of a body, the perimeter of the base of the body lying on a plane, and the body presenting a central opening (16) which can directly or indirectly rest on the surface of the wall to be drilled.

9. A packaging for items, comprising:
   a) a first hollow body delimiting a space, the hollow body presenting a central opening, at least one lateral wall, and at least a wall opposite to the opening;
   b) a plate element capable of closing the opening;
   c) a joining member capable of connecting the at least one lateral wall to the plate element, whereby the plate element may be applied across the opening;
   d) a second hollow body removably placed within the first hollow body that defines a second space and comprises a surface that is capable of being drilled through and thus crossed by a twist drill, wherein the surface comprises a recess in the second hollow body formed by concentric circular depressions of different depths, which terminates at a deepest depth thereof in an area (10) that is closed prior to being drilled through, the radiuses of the depressions respectively decreasing toward the dimensions of the area (10), whereby the concentric depressions are adapted to guide the twist drill, and whereby further the second hollow body may be used for holding the dust due to the drilling.

10. A packaging as in claim 5, wherein a gasket (14) is obtained by making a cut along preferential cutting lines indicated on plate element (2) and removing a portion (4) of the plate element (2) that is defined by the cut made; whereby the gasket (14) comprises the material of plate element (2) that remains around the central opening (16) and under the plane flange (11).

11. A packaging as in claim 1, wherein the opening (16) has a perimeter that lies in a plane, whereby the central opening (16) is capable of directly or indirectly resting on the surface that is to be drilled.

12. A packaging for articles, comprising:
 a) a hollow body delimiting a space capable of being filled with articles, said hollow body further comprising:
  (i) an opening whereby the space may be accessed, and
  (ii) a wall opposite the opening, which wall possesses an area comprising the same material as comprises the hollow body, said area comprising the same material as comprises the hollow body, said area adapted to be drilled through by a drill and that prior to such drilling is closed by material of the hollow body (6), said area being formed within at least two depressions, a first of said depressions being within the second of said depressions, the first depression having a smaller radius and deeper depth as measured from the wall in an inward direction toward the opening than the second depression; and
 b) a plate element connected to the hollow body across the opening, whereby the space is substantially closed when the plate element is in place.

13. A packaging for articles as in claim 12, wherein the hollow body is capable of containing residue created by drilling, and the opening of the hollow body is adapted to be placed against a surface to be drilled when at least a part of the plate element is removed.

14. A packaging for articles as in claim 12, wherein the plate element comprises markings indicating a preferential cutting pattern that defines an inner edge of a gasket area, which gasket area comprises a material that facilitates sealing of the opening against the surface to be drilled when a portion of the plate element within the preferential cutting area is removed.

15. A packaging for articles as in claim 12, wherein an edge of the opening lies in a plane, whereby the hollow body is adapted to abut a flat surface to be drilled continuously about the edge of the opening.

* * * * *